United States Patent
Delfosse et al.

(10) Patent No.: US 12,524,699 B2
(45) Date of Patent: Jan. 13, 2026

(54) SELECTING DECODER USED AT QUANTUM COMPUTING DEVICE

(71) Applicant: Microsoft Technology Licensing, LLC, Redmond, WA (US)

(72) Inventors: Nicolas Guillaume Delfosse, Seattle, WA (US); Alexander Vaschillo, Redmond, WA (US); Andres Paz Sampedro, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 18/476,055

(22) Filed: Sep. 27, 2023

(65) Prior Publication Data

US 2025/0068956 A1 Feb. 27, 2025

Related U.S. Application Data

(60) Provisional application No. 63/578,730, filed on Aug. 25, 2023.

(51) Int. Cl.
*G06N 10/70* (2022.01)
*G06N 10/20* (2022.01)

(52) U.S. Cl.
CPC .......... *G06N 10/70* (2022.01); *G06N 10/20* (2022.01)

(58) Field of Classification Search
CPC .............................. G06N 10/70; G06N 10/20
See application file for complete search history.

(56) References Cited

U.S. PATENT DOCUMENTS

| 11,281,524 | B1* | 3/2022 | Egger | G06N 10/80 |
| 2020/0310908 | A1* | 10/2020 | Hogaboam | G06F 11/10 |
| 2024/0320536 | A1* | 9/2024 | Tsfasman | G06N 10/20 |

OTHER PUBLICATIONS

Das, et al., "LILLIPUT: A Lightweight Low-latency Lookup-table based Decoder for Near-term Quantum Error Correction", In Repository of arXiv:2108.06569v1, Aug. 14, 2021, pp. 1-13.
International Search Report and Written Opinion Issued in PCT Application No. PCT/US2024/039965, Mailed on Nov. 14, 2024, 16 Pages.

(Continued)

Primary Examiner — Joseph D Torres
(74) Attorney, Agent, or Firm — Alleman Hall & Tuttle LLP

(57) ABSTRACT

A computing system is provided, including one or more processing devices. The one or more processing devices are configured to receive quantum circuit parameters including a code parameter of an error correction code and a number of T gates included in a quantum circuit. The one or more processing devices are further configured to receive respective decoder parameters of each of a plurality of candidate decoders. The decoder parameters include a physical noise rate of a plurality of physical qubits at which the quantum circuit is configured to be executed and a stopping time of the candidate decoder. The one or more processing devices are further configured to compute respective spacetime costs of the candidate decoders based on the quantum circuit parameters and the decoder parameters. The one or more processing devices are further configured to output a selection of a lowest-spacetime-cost decoder for implementation at a quantum computing device.

20 Claims, 14 Drawing Sheets

(56) References Cited

OTHER PUBLICATIONS

Iolius, et al., "Decoding Algorithms for Surface Codes", In Repository of arXiv:2307.14989, Jun. 27, 2023, 53 Pages.
Paetznick, et al., "Performance of Planar Floquet Codes with Majorana-based Qubits", In Repository of arXiv:2202.11829v2, Oct. 10, 2022, pp. 1-16.

* cited by examiner

SELECTING DECODER USED AT QUANTUM COMPUTING DEVICE

CROSS REFERENCE TO RELATED APPLICATIONS

This application claims priority to U.S. Provisional Patent Application Ser. No. 63/578,730, filed Aug. 25, 2023, the entirety of which is hereby incorporated herein by reference for all purposes.

BACKGROUND

A fault-tolerant quantum computing device is a quantum computing device at which error correction is performed using an error correction code. One such error correction code is the surface code, which has been implemented with multiple different quantum hardware configurations.

SUMMARY

According to one aspect of the present disclosure, a computing system is provided, including one or more processing devices. The one or more processing devices are configured to receive a plurality of quantum circuit parameters including a code parameter of an error correction code and a number of T gates included in a quantum circuit. The one or more processing devices are further configured to receive respective decoder parameters of each of a plurality of candidate decoders. The decoder parameters include a physical noise rate of a plurality of physical qubits at which the quantum circuit is configured to be executed and a stopping time of the candidate decoder. The one or more processing devices are further configured to compute respective spacetime costs of the candidate decoders based at least in part on the quantum circuit parameters and the decoder parameters. The one or more processing devices are further configured to output a selection of a lowest-spacetime-cost decoder of the plurality of candidate decoders for implementation at a quantum computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Multiple different decoder algorithms have been developed for the surface code. For example, an efficient decoder for the surface code based on a minimum weight matching algorithm has been developed and further optimized in recent years. Another decoder algorithm is the Union-Find decoder, which has lower worst-case complexity but is slightly less accurate. Other decoders based on Markov Chain Monte Carlo, neural networks, and reinforcement learning have also been proposed. A developer of a quantum computing device is therefore faced with the challenge of deciding which decoder to implement.

Decoders are typically compared with each other by considering their accuracy (in terms of the logical error rate they achieve), or their average- or worst-case complexities. However, metrics such as asymptotic complexity do not provide all the information that is relevant to selection of a decoder for use at a given fault-tolerant quantum computing device. Instead, the selection of the decoder depends upon multiple contextual factors. First, the type of qubits included in the quantum computing device affects the performance of different decoders, due to the differences in the noise rates, gate speeds, and measurement speeds of the qubits. In examples in which qubit speed is slow, slower decoders also become more viable.

Second, the encoding used for the logical qubits also affects the choice of decoder. More generally, the details of the implementation of the logical gates and the compilation algorithm affect decoder selection. To simplify the description of the decoder selection protocol in the following examples, a simple compilation algorithm for a single logical qubit is considered. However, other compilation algorithms may be used in other examples.

Figure 1:
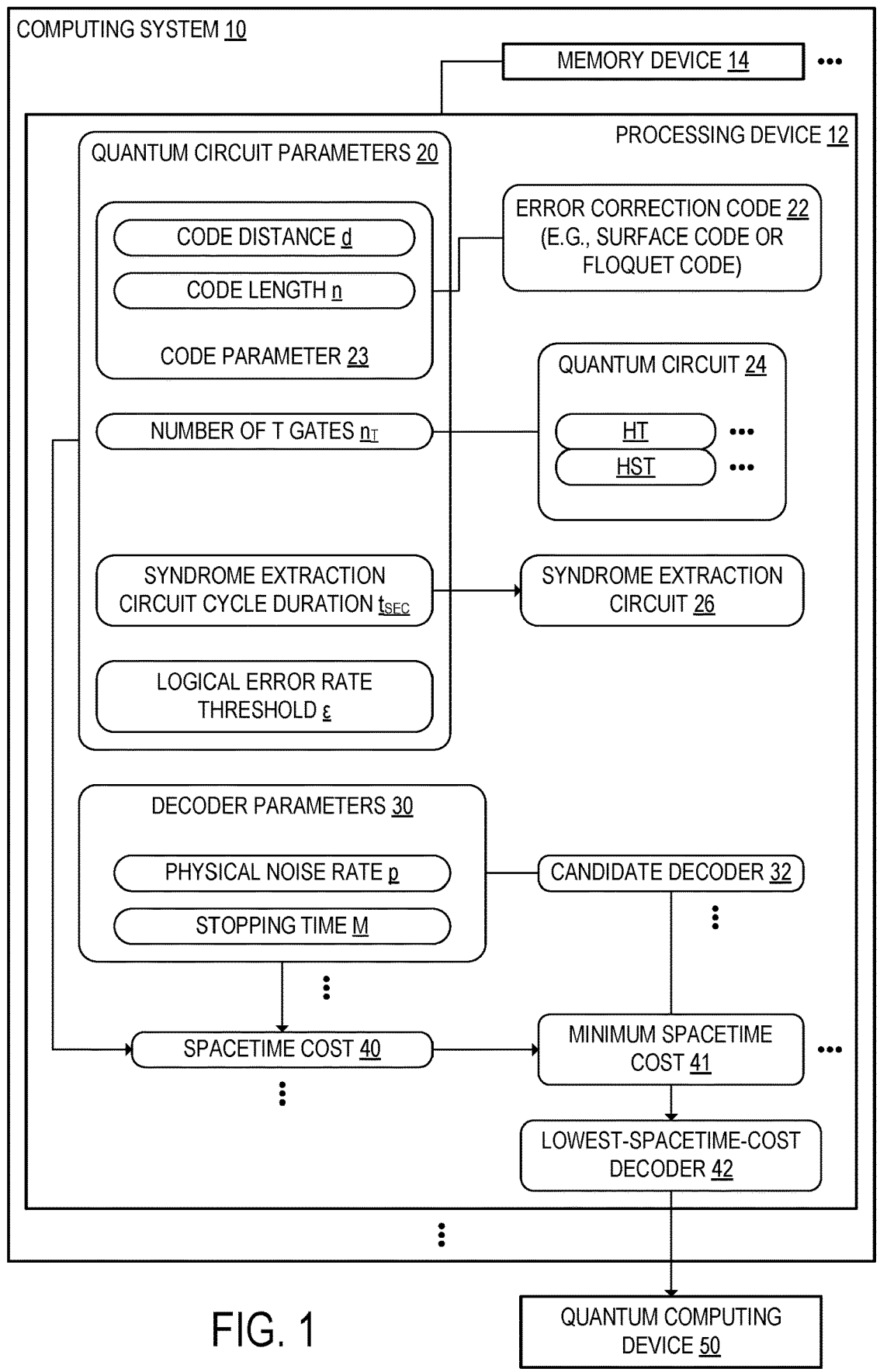
FIG. 1 schematically depicts an example computing system including one or more processing devices at which decoder selection is performed for a quantum computing device, according to one example embodiment.

FIG. 1 schematically depicts an example computing system 10 including one or more processing devices 12 at which decoder selection is performed for a quantum computing device 50. The computing system 10 further includes one or more memory devices 14 that are communicatively coupled to the one or more processing devices 12. The plurality of processing devices 12 may, for example, include one or more central processing units (CPUs), one or more graphics processing units (GPUs), and/or one or more other hardware accelerators. The one or more memory devices 14, may include one or more volatile memory devices and/or one or more non-volatile memory devices. The functionality of the one or more processing devices 12 and the one or more memory devices 14 is, in some examples, distributed over a plurality of physical computing devices, such as compute nodes located in a data center, whereas in other examples, the one or more processing devices 12 and the one or more memory devices 14 are included in a single physical computing device.

At the one or more processing devices 12, a decoder is selected from among a plurality of candidate decoders 32 for implementation at a quantum computing device 50. At the quantum computing device 50, a plurality of logical qubits are instantiated, each with a respective plurality of physical qubits. The physical qubits are encoded to form the logical qubits using an error correction code 22. For example, the error correction code 22 may be a surface code or a Floquet code.

Figure 2A:
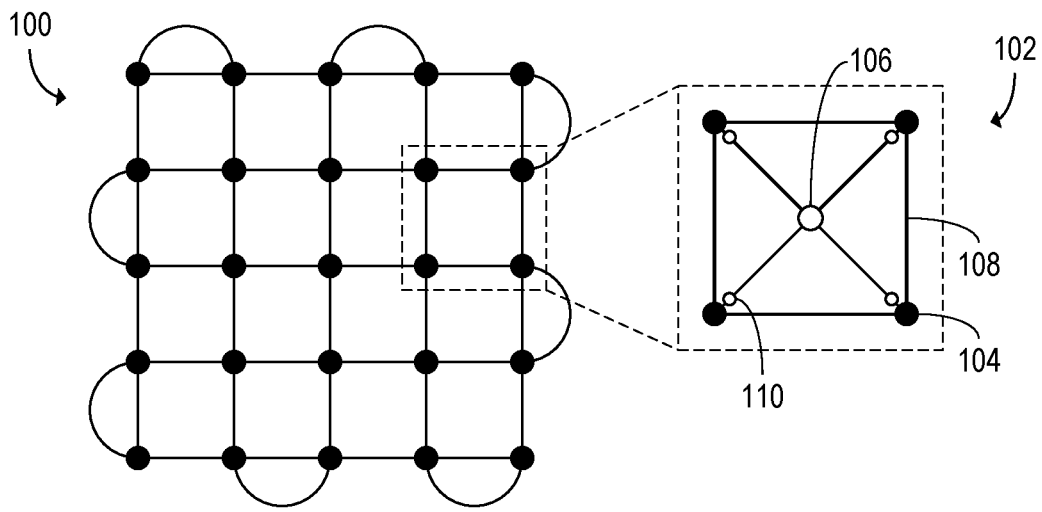
FIG. 2A shows an example of a physical qubit layout configured to be used with a surface code, according to the example of FIG. 1.

In the following discussion, a single logical qubit encoded with a distance-d surface code is considered. The distance-d surface code uses a d×d grid of data qubits. FIG. 2A shows an example of a physical qubit layout 100 configured to be used with the surface code. In the example of FIG. 2A, each of a plurality of plaquettes 102 included in the physical qubit layout 100 includes four data qubits 104 arranged in a square. Each plaquette 102 further includes an ancilla qubit 106 located at a center of the plaquette 102. Respective electrical connections 108 extend between adjacent pairs of data qubits 104 and between the ancilla qubit 106 and each of the data qubits 104. A respective controlled not (CNOT) gate 110 is located along each of the ancilla-qubit-data-qubit electrical connections.

Figure 2B:
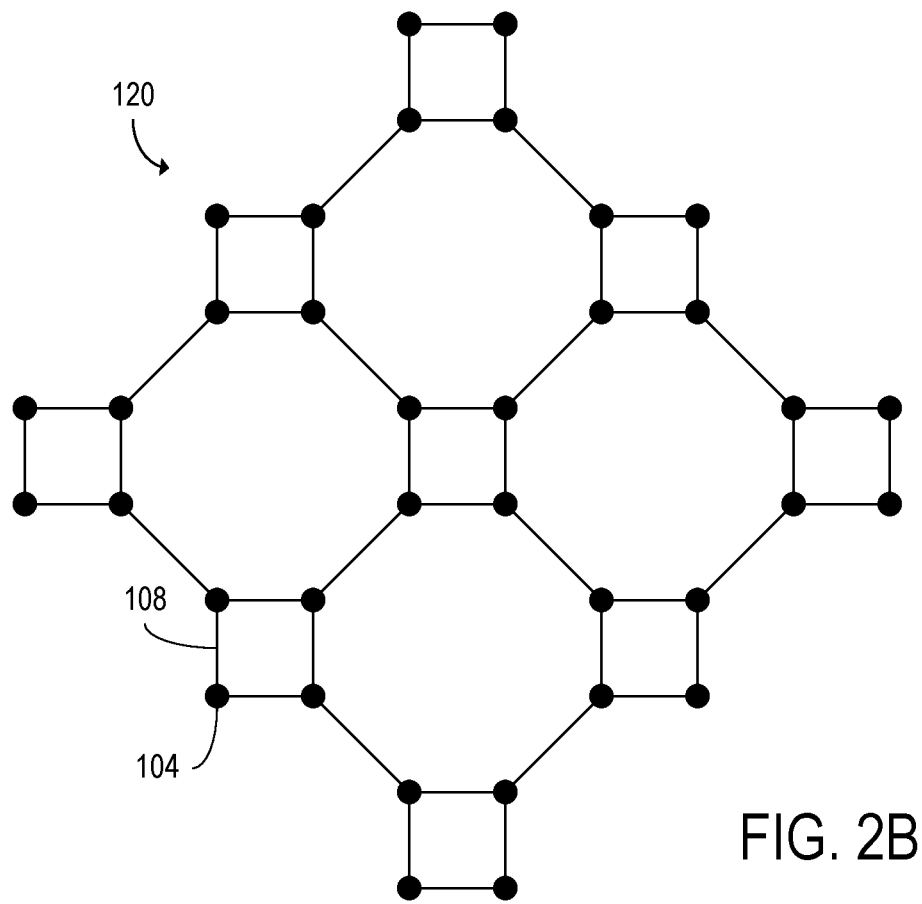
FIG. 2B shows an example of a physical qubit layout configured to be used with a Floquet code, according to the example of FIG. 1.

FIG. 2B shows another example physical qubit layout 120 configured to be used with the Floquet code. In the physical qubit layout 120, the data qubits 104 form a square-octagon lattice.

Returning to the example of FIG. 1, the one or more processing devices 12 are further configured to receive a plurality of quantum circuit parameters 20. These quantum circuit parameters 20 include a code parameter 23 of the error correction code 22. In some examples, as discussed in further detail below, the code parameter 23 is a code distance d of the error correction code 22. In other examples, the code parameter 23 is a code length n of the error correction code 22.

To avoid the accumulation of faults, a syndrome extraction circuit (SEC) 26 is continuously run during implementation of the error correction code 22. The syndrome extraction circuit 26, in the example in which the error correction code 22 is the surface code, performs local measurement in the square grid using the ancilla qubits 106 placed in the center of each square plaquette 102. With superconducting qubits, the syndrome extraction can be implemented with 1 round of preparation, 4 rounds of CNOT gates and 1 round of measurement. With other types of qubits, the syndrome extraction may use a sequence of multiple measurements.

One execution of the syndrome extraction circuit 26 is referred to as an SEC cycle, and the time it takes to execute one SEC cycle is denoted by $t_{SEC}$ (in seconds). The SEC cycle duration $t_{SEC}$ of the SEC 26 is included in the plurality of quantum circuit parameters 20 in the example of FIG. 1. The SEC cycle duration $t_{SEC}$ of the SEC 26 depends on the gate and measurement time and may vary significantly. The most relevant time scale for decoder selection is not the decoding time itself, but instead how the decoding time compares with the SEC cycle duration $t_{SEC}$. Therefore, the runtime of the SEC 26 is used herein as a unit in which the decoding time is expressed. In the case of superconducting qubits, a standard assumption is $t_{SEC}=10^{-6}$. During an SEC cycle, $d^2-1$ syndrome bits are extracted (one per surface code plaquette). These syndrome values are used by the decoder to identify and correct errors.

The selection of the decoder is performed for a quantum circuit 24. The quantum circuit 24 includes single-qubit Clifford gates H and S that are implemented by deformation of the surface code patch using additional qubits. In the following discussion, the H and S gates are assumed to be implemented in 2d SEC cycles. A logical Z measurement may also be performed in d SEC cycles ending with a physical measurement of all the $d^2$ qubits included in the surface code patch. These gates are each completed with a T gate implemented by state injection. To implement the T gate, a second logical qubit, also encoded with the distance-d surface code, is used to prepare a logical T state. The T gate is obtained using a standard state injection circuit.

Single-qubit logical operations can be written or approximated by a quantum circuit 24 of the following form:

$$HS^{a_1}THS^{a_2}T \ldots HS^{a_n}T$$

This quantum circuit 24 is constructed from a sequence of logical H, S and T gates with $n_T$ T gates. The parameters $a_i$ take values of 0 or 1. Accordingly, the quantum circuit 24 is a sequence of logical gates that are each an HT gate or an HST gate. These sequences can be used to compile any unitary with a minimum T count. By adding entangling logical operations such as logical CNOT gates or joint measurements, a universal set of logical gates may be obtained.

One goal of the decoder selection is to achieve a low enough logical error rate to reliably implement any sequence with the above form for a given number $n_T$ of T gates. Thus, the plurality of quantum circuit parameters 20 further include the number of T gates $n_T$ included in the quantum circuit 24.

The one or more processing devices 12 are further configured to receive respective decoder parameters 30 of each of a plurality of candidate decoders 32. These decoder parameters 30 include a physical noise rate p of the plurality of physical qubits at which the quantum circuit 24 is configured to be executed. The decoder parameters of each candidate decoder 32 further include a respective stopping time M, as discussed in further detail below.

The failure rate of a surface code decoder is estimated by considering the probability $P_L(d, p)$ that a logical error appears after correction when running d consecutive SEC cycles with a physical noise rate p. One heuristic estimate based on numerical results for a standard CNOT-based SEC 26 gives the failure rate as:

$$P_L(d, p) = 0.1 \left(\frac{p}{100}\right)^{\frac{d+1}{2}}$$

This heuristic is valid for odd distances d=3, 5, ... and in the regime $p \ll 10^{-2}$.

Figure 3:
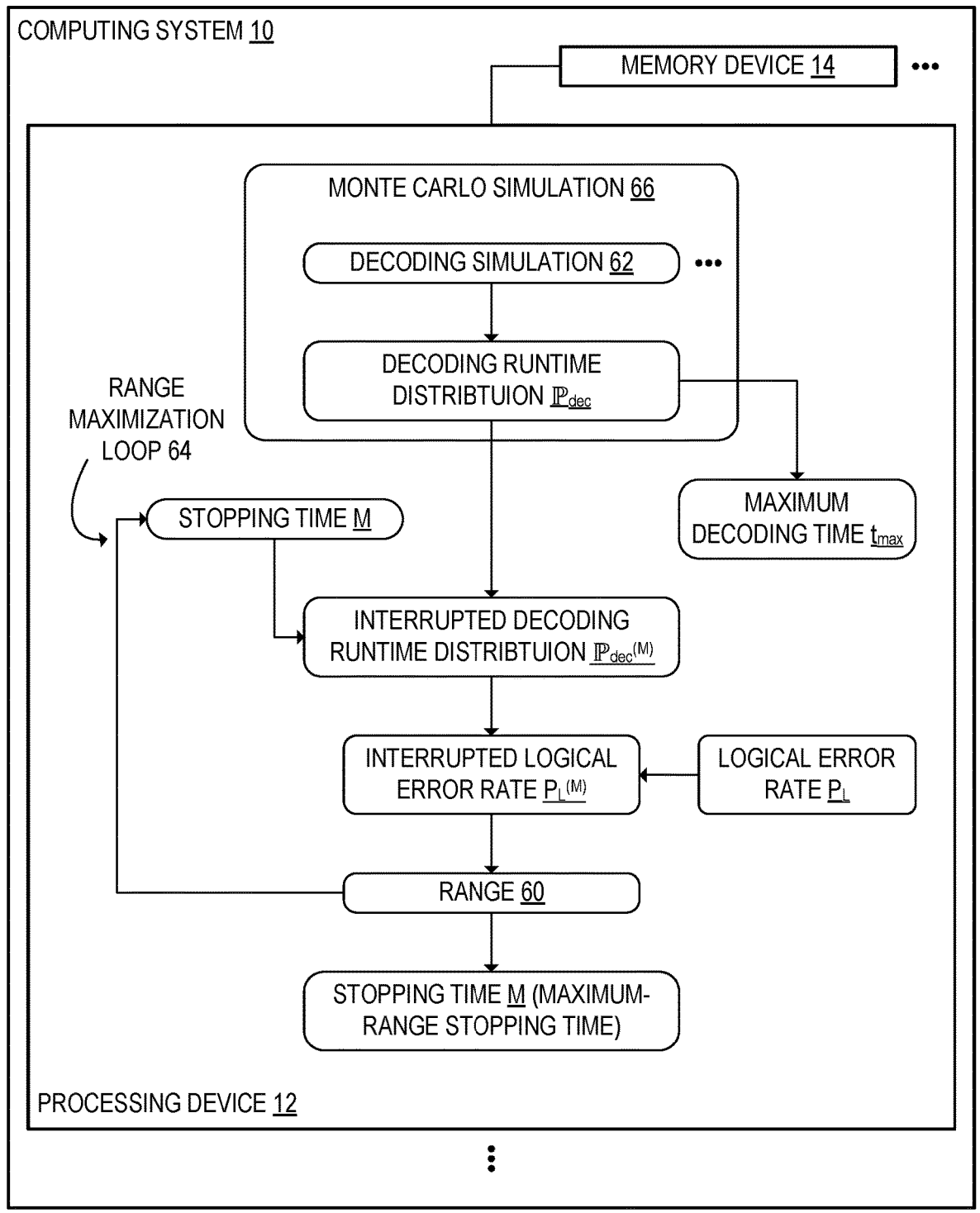
FIG. 3 schematically shows the computing system when the one or more processing devices are further configured to compute a maximum decoding time and a decoding runtime distribution of a candidate decoder, according to the example of FIG. 1.

The decoding time that elapses during the execution of a candidate decoder 32 is a random variable that depends on the fault configuration that occurs. The probability that the candidate decoder 32 runs in t seconds is given by a decoding runtime distribution $\mathbb{P}_{dec}(t)$. Each value of $\mathbb{P}_{dec}(t)$ is the estimated probability that a candidate decoder 32 has a duration of t. The maximum decoding time, denoted $t_{max}$, is the largest such value of t with nonzero probability. FIG. 3 schematically shows the computing system of FIG. 1 when the one or more processing devices 12 are further configured to compute a maximum decoding time $t_{max}$ and the decoding runtime distribution $\mathbb{P}_{dec}(t)$ of a candidate decoder 32. As shown in the example of FIG. 3, the one or more processing devices 12 are configured to perform a Monte Carlo simulation 66 in which a plurality of decoding simulations 62 are performed. The decoding runtime distribution $\mathbb{P}_{dec}(t)$ is estimated as a probability distribution over values of t.

Figure 4:
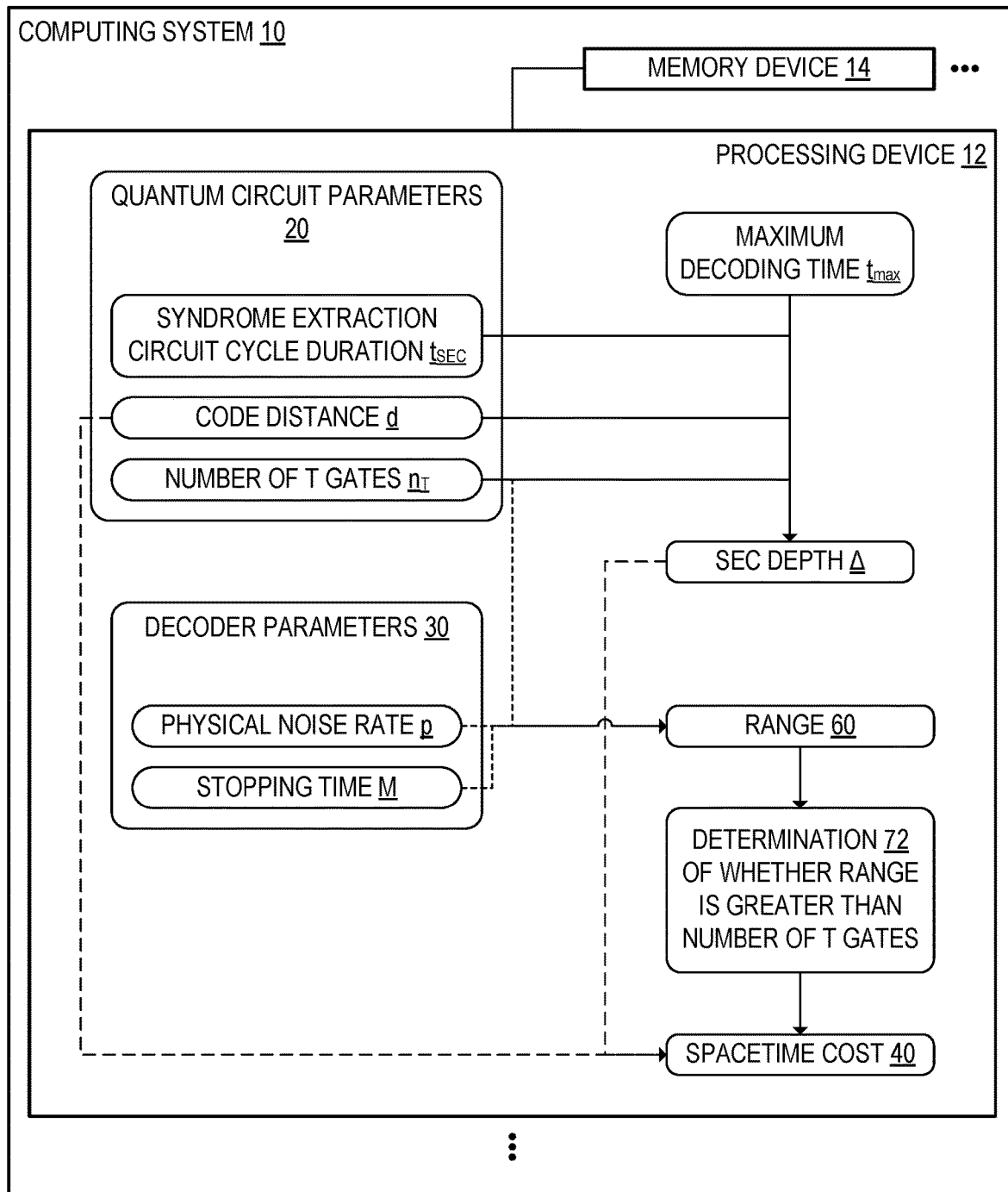
FIG. 4 schematically shows the computing system when the one or more processing devices are further configured to compute a syndrome extraction circuit depth, according to the example of FIG. 1.

FIG. 4 schematically shows the computing system 10 when the one or more processing devices 12 are further configured to compute an SEC depth Δ, as discussed in further detail below. In the following example, the candidate decoder 32 is a sliding window decoder. The sliding window decoder takes as an input d consecutive rounds of syndrome data, denoted here as r+1, r+2, ..., r+d, and returns a Pauli correction on the n data qubits. This Pauli correction is computed to cancel the effect of faults occurring during the first half of the decoding window, covering the first t=(d+1)/2 rounds. The window is then moved forward by t rounds and the decoder is applied to the rounds r+t+1, r+t+2, ..., r+d. Thus, the d consecutive rounds of syndrome data are decoded.

In addition to the syndrome data, the candidate decoder 32 also takes the correction estimated for the previous window as input. Thus, the candidate decoder 32 waits for the result of the decoding of the previous window. In a circuit that contains only Clifford operations, this correction can be applied later, since the correction is a Pauli correction that can be propagated through the quantum circuit 24 and applied to the qubits later. However, at a non-Clifford gate (a T gate in the current example), application of the conditional S gate takes as input the logical outcome of the measurement of the ancilla qubit, which is extracted by the candidate decoder 32. This extraction induces a delay of $t_{max}/t_{SEC}$ SEC cycles for each T gate.

The SEC depth Δ, which is defined as the total number of SEC cycles performed during execution of a quantum circuit 24 with the form $HS^{a_1}THS^{a_2}T \ldots HS^{a_{n_T}}T$, is given as follows:

$$\Delta(n_T, d, p, t_{max}) = n_T \left(7d + \frac{t_{max}}{t_{SEC}}\right)$$

where d is the code distance, p is the physical noise rate, and $n_T$ is the number of T gates. In the above equation, the term 7d accounts for the implementation of the H and conditional S gates and the logical measurement. As shown in the example of FIG. 4, the one or more processing devices 12 are further configured to compute the respective SEC depth Δ of each candidate decoder 32. The SEC depth Δ is computed based at least in part on the code depth d, the number of T gates $n_T$, the SEC cycle duration $t_{SEC}$, and the maximum decoding time $t_{max}$, as shown in the above equation.

A smallest odd-integer code distance δ is defined as follows for a sequence of that includes up to $n_T$ T gates. Given the number of T gates $n_T$ and the physical noise rate p, the smallest odd-integer code distance δ is the smallest odd integer δ≥3 such that:

$$\frac{\Delta(n_T, d, p, t_{max}) \cdot P_L(d, p)}{\delta} \leq \frac{1}{2}$$

Using the above inequality, the smallest odd-integer code distance δ that achieves a low noise rate for the whole quantum circuit 24 is selected. "Low noise rate" refers here to a probability of an error in the logical outcome below 0.5. Thus, the smallest odd-integer code distance δ is the distance that allows reliable implementation of a circuit with the form discussed above. The smallest odd-integer code distance may be denoted as $\delta(n_T, p, t_{max})$.

Figure 5:
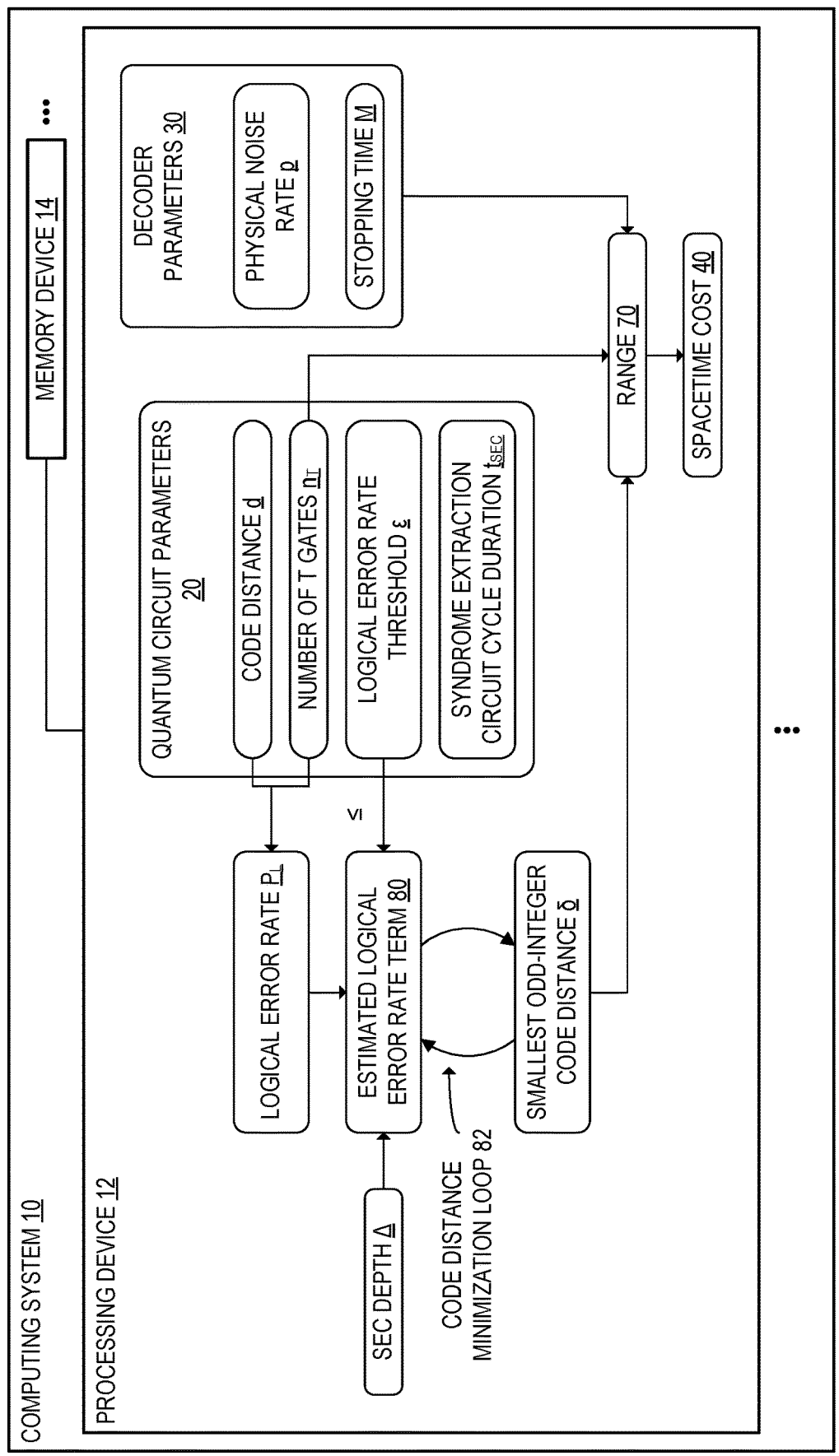
FIG. 5 schematically shows the computing system when the one or more processing devices are configured to compute a smallest odd-integer code distance for a candidate decoder, according to the example of FIG. 1.

The computing system 10 is schematically depicted in FIG. 5 when the one or more processing devices 12 are configured to compute the smallest odd-integer code distance δ. The one or more processing devices 12 are configured to compute a value of an estimated logical error rate term 80 equal to the left-hand side of the above inequality. The one or more processing devices 12 are further configured to execute a code distance minimization loop 82 in which the one or more processing devices 12 perform an iterative search for the smallest odd-integer code distance δ.

The quantum circuit parameters 20 further include a logical error rate threshold ε in the example of FIG. 5. The logical error rate threshold ε is set to ½ in the example inequality discussed above. In other examples, the logical error rate threshold ε is a user-defined parameter. When the one or more processing devices 12 execute the code distance minimization loop 82, the one or more processing devices 12 are configured to compare the estimated logical error rate term 80 to the logical error rate threshold ¿ and compute the smallest odd-integer code distance δ as a code distance at which the value of the estimated logical error rate term 80 is below the logical error rate threshold ¿.

The estimated logical error rate term 80 is used as a proxy for the logical error rate of the whole quantum circuit 24. However, the estimated logical error rate term 80 is an inexact approximation of the logical error rate $P_L(d, p)$, since the estimated logical error rate term 80 does not account for the details of the implementation of the H gate and the S gate by code deformation. Using the same estimate of the logical error rate $P_L(d, p)$ for the H gate and the S gate is an approximation.

Returning to FIG. 1, execution of the candidate decoder 32 may be stopped prematurely once a maximum allocated time is reached. Thus, the decoder parameters 30 further include a stopping time M of the candidate decoder 32. The maximum runtime of the candidate decoder 32 may accordingly be reduced at the price of an increased logical error rate $P_L(d, p)$. For example, the stopping time M may be selected such that the logical error rate doubles when accounting for the decoding timeout failures. This runtime reduction allows the candidate decoder 32 to be executed at a speed that keeps up with the pace of error accumulation in the quantum computing device 50.

The techniques discussed below allow the stopping time M of a candidate decoder 32 to be identified in a manner that brings the candidate decoder 32 closer to a Pareto front of speed and logical error rate. Using the techniques discussed below, the stopping time M for the candidate decoder 32 is selected based at least in part on the failure rate and runtime distribution of the candidate decoder 32. The one or more processing devices 12 are configured to compute the stopping time M based at least in part on the decoding runtime distribution $\mathbb{P}_{dec}$ computed via the Monte Carlo simulation 66, as discussed above with reference to FIG. 3.

To reduce the impact of the decoding delay, the candidate decoder 32 may be stopped after M seconds. The stopping time M may alternatively be measured in units of the SEC cycle time $t_{SEC}$. Denoting the initial decoding runtime distribution as $\mathbb{P}_{dec}$, the interrupted decoding runtime distribution with this stopping condition is given by:

$$\mathbb{P}_{dec}^{(M)}(t) = \begin{cases} 0 \text{ if } t > M \\ \mathbb{P}_{dec}(t)/\mathbb{P}_{dec}(t \leq M) \end{cases}$$

Computation of the interrupted decoding runtime distribution $\mathbb{P}_{dec}^{(M)}(t)$ is further shown in the example of FIG. 3. There are two sources of failure for this interrupted decoder: either the candidate decoder 32 returns an incorrect correction, or it does not terminate fast enough (in less than M seconds), which leads to a timeout failure. Therefore, the interrupted logical error rate of the interrupted decoder, denoted $P_L^{(M)}(d, p)$, satisfies the following inequality:

$$\max(P_L(d, p), \mathbb{P}_{dec}(t > M)) \leq P_L^{(M)}(d, p) \leq P_L(d, p) + \mathbb{P}_{dec}(t > M)$$

In the above inequality, $P_L(d, p)$ is the logical error rate of the candidate decoder 32 without the stopping condition.

In the numerical simulations discussed below, the upper bound $P_L(d, p) + \mathbb{P}_{dec}(t > M)$ is used as an approximation of $P_L^{(M)}(d, p)$. This approximation can be estimated efficiently without further Monte-Carlo simulations 66. In addition, this approximation is correct up to a 2×multiplicative factor, since $$\max(P_L(d, p), \mathbb{P}_{dec}(t > M)) \geq \frac{P_L(d, p) + \mathbb{P}_{dec}(t > M)}{2}$$

The performance of a candidate decoder 32 may be measured as a function of its stopping time M. The performance of the decoder is given by the maximum length $n_T$ of a sequence of the form $HS^{a_1}THS^{a_2}T \ldots HS^{a_{n_T}}T$ that can be implemented reliably in the manner discussed above with reference to the definition of the smallest odd-integer code distance $\delta$. This maximum distance is referred to as the range 60 of the candidate decoder 32, which is formally defined as follows:

$$\text{range}(\delta, p, M) = \max\left\{n_T = 1, 2, \ldots \ \middle| \ \frac{\Delta(n_T, d, p, M) \cdot P_L^{(M)}(d, p)}{\delta} \leq \frac{1}{2}\right\}$$

As depicted in the example of FIG. 4, the one or more processing devices 12 are configured to compute the range based at least in part on the code distance d, the physical noise rate p, and the stopping time M.

By varying M, the range 60 of the candidate decoder 32 may be maximized, as shown in the example of FIG. 3. In a range maximization loop 64, the one or more processing devices 12 are configured to iteratively update the stopping time M to search for the maximum value of the range 60. The one or more processing devices 12 are configured to compute the stopping time M of the candidate decoder 32 as a maximum-range stopping time M that approximately maximizes the range 60 of the candidate decoder 32. Maximizing the range 60 of the candidate decoder 32 increases the depth of sequences of logical gates that can be implemented with a logical error rate $P_L$ below the logical error rate threshold $\varepsilon$ on the output distribution of the full quantum circuit 24. As shown in the example of FIG. 5, the range 60 of the candidate decoder 32 is computed for a corresponding value of the smallest odd-integer code distance $\delta$. This value of the smallest odd-integer code distance $\delta$ may be held as a constant input to the range computation performed in the range maximization loop 64.

In other examples, other criteria may also be used when selecting the stopping time M. For example, space and time overhead costs of the encoding specified by the error correction code 22 may be considered when the one or more processing devices 12 compute the stopping time M.

In one example, the qubits have a physical noise rate $p=10^{-3}$ and an SEC cycle time of one microsecond, i.e., $t_{SEC}=10^{-6}$. These values approximately correspond to the physical noise rate p and SEC cycle time $t_{SEC}$ of superconducting qubits. The candidate decoder 32 in this example has a logical error rate $P_L(d, p)$ that is estimated using the heuristic discussed above. The candidate decoder 32 achieves this logical error rate with a quadratic maximum runtime of $d^6$ microseconds and a linear average runtime of $pd^3$. The runtime distribution of the candidate decoder 32 in this example is a binomial distribution, such that the probability that the decoding terminates during the $(\bar{t}+1)$th SEC cycle is given by:

$$\mathbb{P}(\bar{t}) = \binom{\bar{t}_{max}}{\bar{t}} q^{\bar{t}} (1-q)^{\bar{t}_{max}-\bar{t}}$$

In the above equation, $$\bar{t}_{max} = \left\lceil \frac{t_{max}}{t_{SEC}} \right\rceil$$

is the maximum decoding runtime in terms of number of SEC cycles, and $q=pd^{-3}$.

Figure 6:
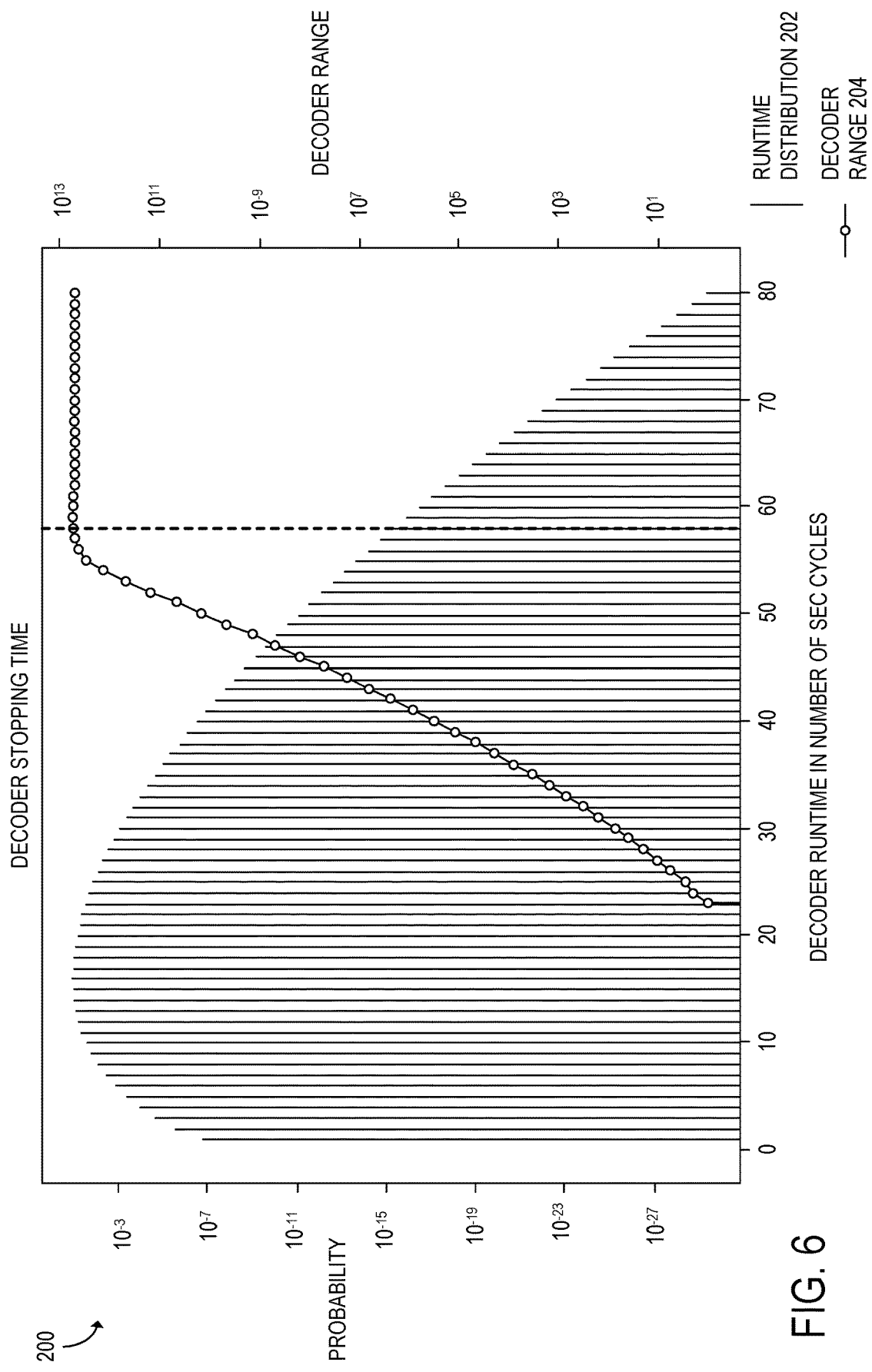
FIG. 6 shows an example stopping time simulation plot that indicates maximum-range stopping time simulation results for an example surface code, according to the example of FIG. 1.

The maximum-range stopping time M of the candidate decoder 32 may be computed numerically. FIG. 6 shows an example stopping time simulation plot 200 that indicates maximum-range stopping time simulation results for a distance-25 surface code with the physical noise rate $p=10^{-3}$. In the example of FIG. 6, the maximum-range stopping time M is equal to 58 SEC cycles. The stopping time simulation plot 200 shows a runtime distribution 202 of stopping probabilities at different numbers of SEC cycles. The stopping time simulation plot 200 further shows a decoder range 204, with the number of SEC cycles that maximizes the decoder range 204 (58 SEC cycles) indicated with a dashed vertical line.

FIGS. 7A-7D show comparisons of maximum-range stopping time simulation results for a first decoder 302 and a second decoder 304, where the first decoder 302 is slower but more accurate than the second decoder 304. The first decoder 302 of FIGS. 7A-7D has a logical error rate $P_L(d, p)$ that is estimated using the heuristic discussed above. The maximum runtime of the first decoder 302 of FIGS. 7A-7D is a quadratic maximum runtime equal to $d^6$ microseconds, and its average runtime is equal to $5pd^3$ microseconds. The second decoder 304 has a logical error rate of $2p_L(d, p)$, a linear maximum runtime of $d^3$ microseconds, and an average runtime of $pd^3$ microseconds.

Figure 7A:
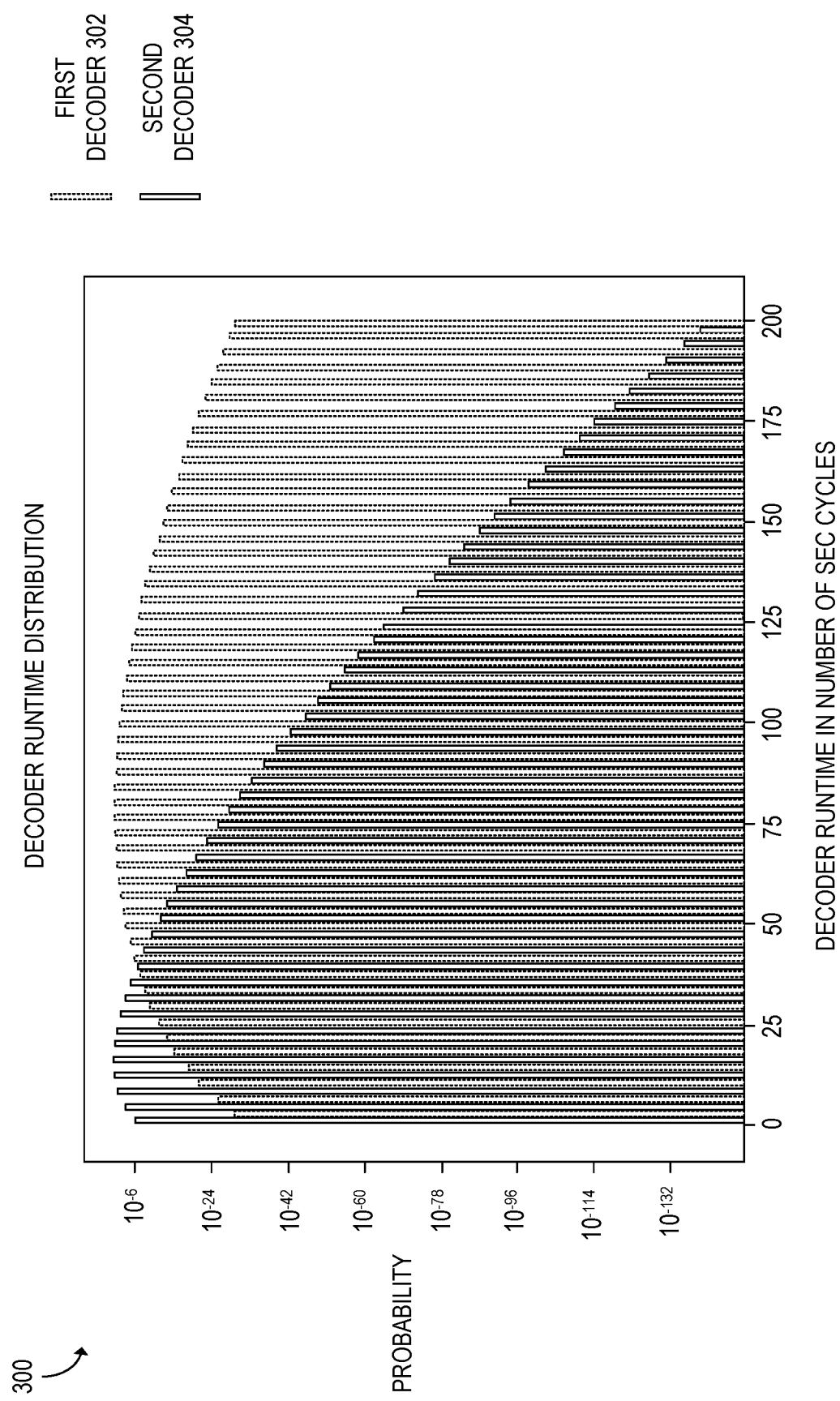
FIG. 7A shows a first runtime distribution plot that depicts respective decoding runtime distributions of a first decoder and a second decoder for a first value of a syndrome extraction circuit cycle time, according to the example of FIG. 1.
Figure 7B:
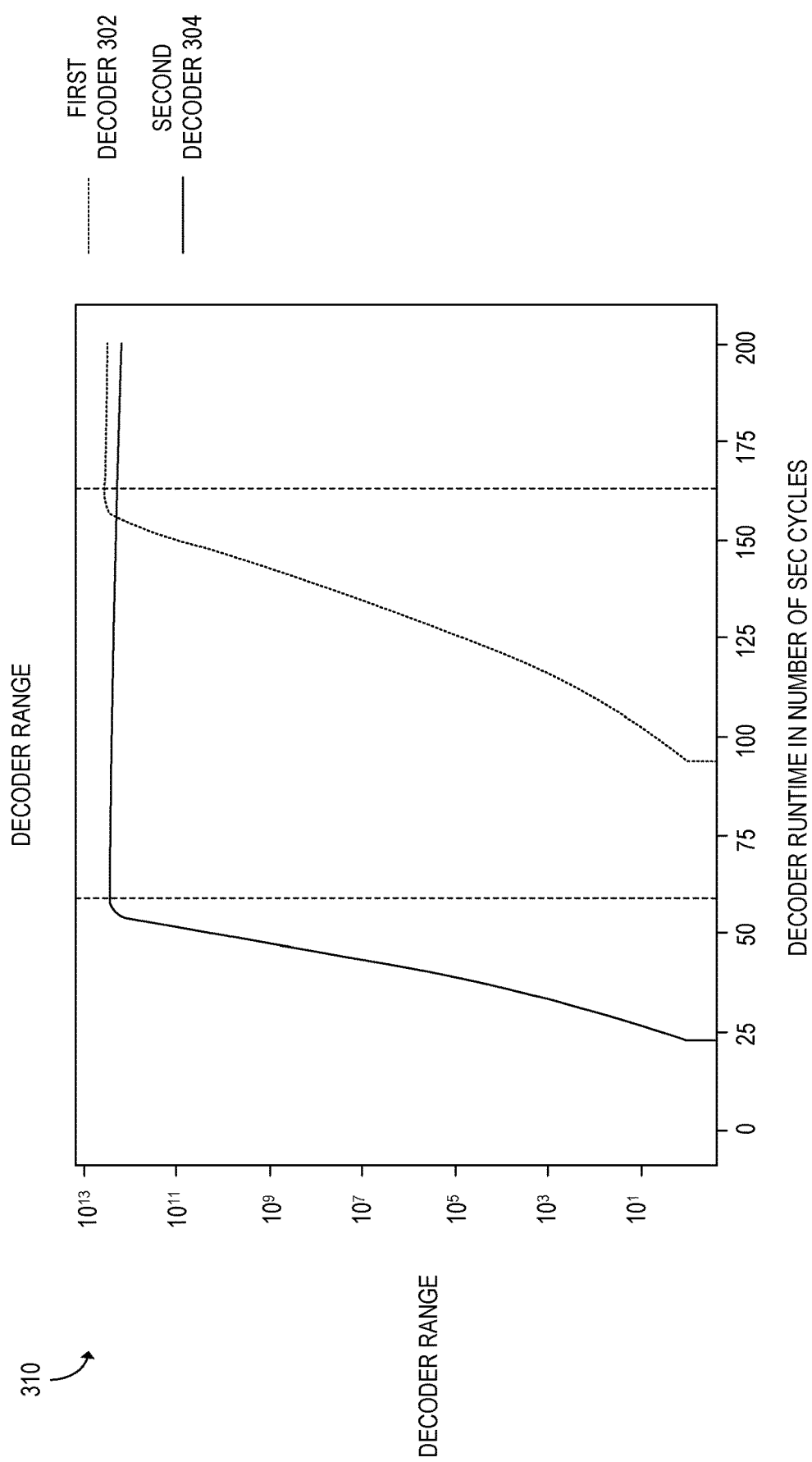
FIG. 7B shows a first range plot of respective ranges of the first decoder and the second decoder, according to the example of FIG. 7A.

FIG. 7A shows a first runtime distribution plot 300 that depicts the respective decoding runtime distributions $\mathbb{P}_{dec}$ of the first decoder 302 and the second decoder 304 for a distance-25 surface code that has a physical noise rate $p=10^{-3}$ and an SEC cycle time of $t_{SEC}=10^{-6}$ seconds. FIG. 7B shows a first range plot 310 of respective ranges of the first decoder 302 and the second decoder 304 for these values of d, p, and $t_{SEC}$. The maximum-range stopping times of the first decoder 302 and the second decoder 304 are also shown in the first runtime distribution plot 300 with dashed vertical lines. In the example of FIG. 7B, the first decoder 302 has a maximum-range stopping time of 163 SEC cycles and has a range of 3,709,198,813,056. The second decoder 304 has a maximum-range stopping time of 59 SEC cycles and a range of 2,682,403,433,476.

Figure 7C:
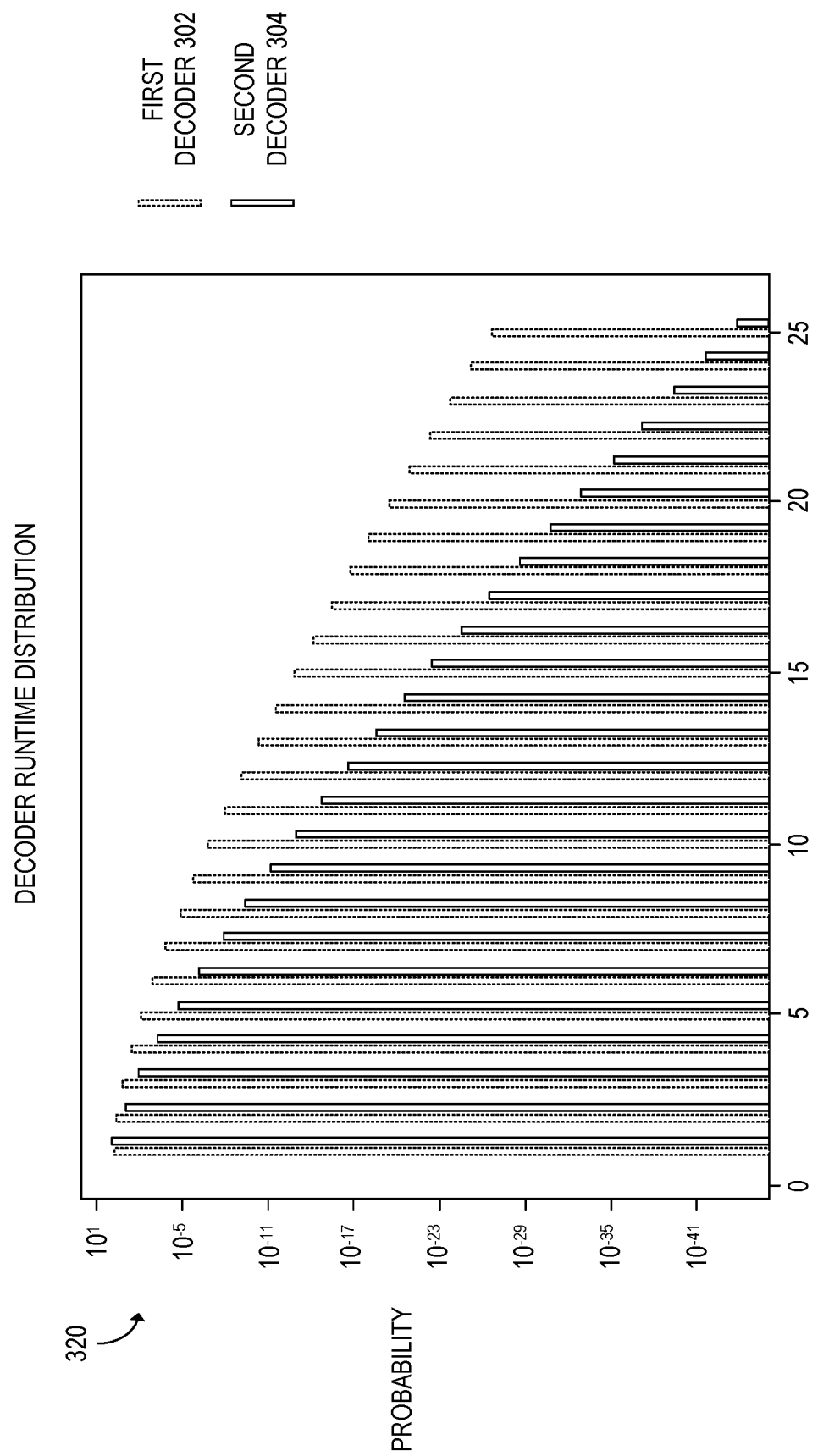
FIG. 7C shows a second runtime distribution plot that depicts the respective decoding runtime distributions of the first decoder and the second decoder for a second value of the syndrome extraction circuit cycle time, according to the example of FIG. 1.
Figure 7D:
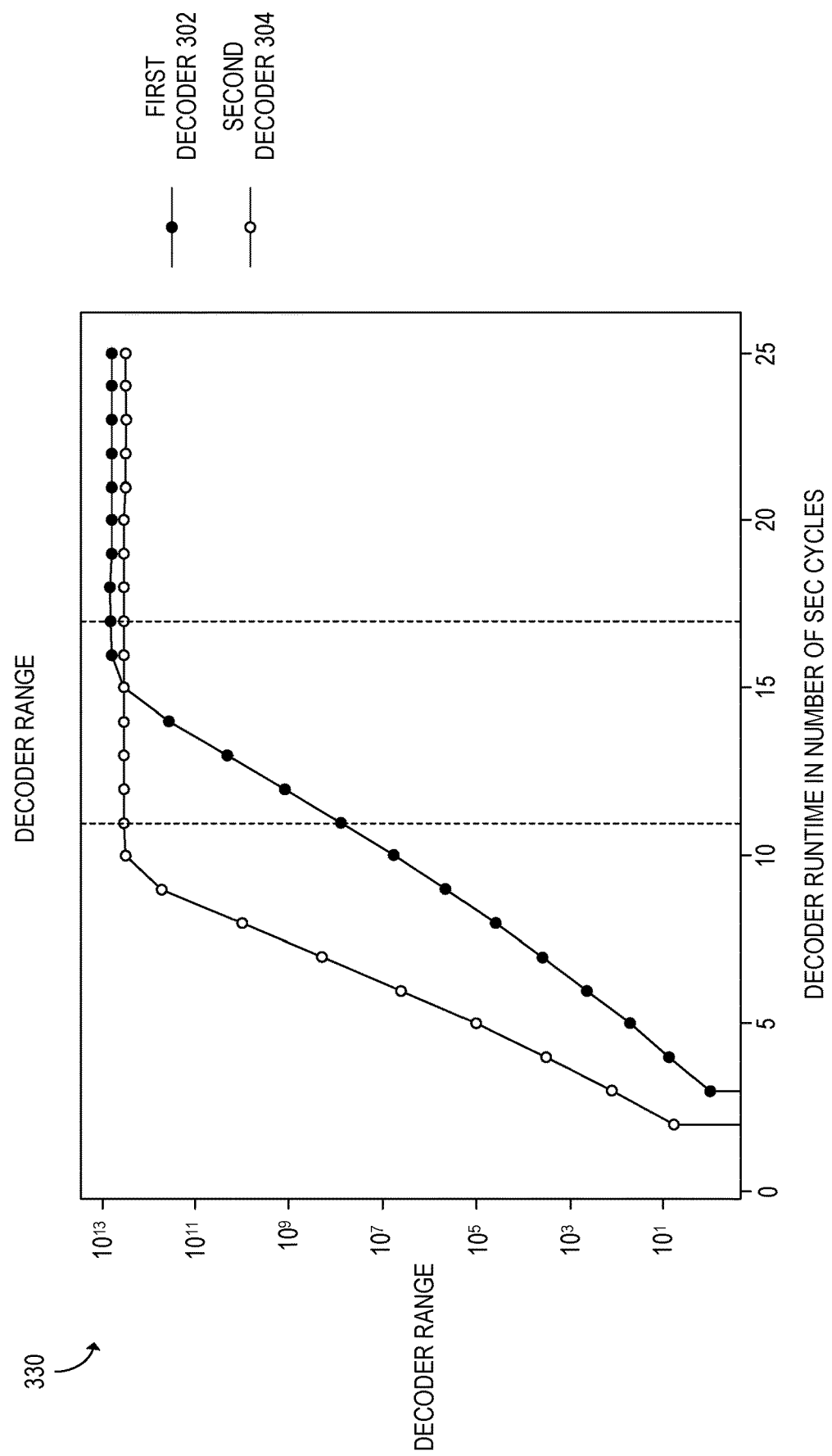
FIG. 7D shows a second range plot of the ranges of the first decoder and the second decoder, according to the example of FIG. 7C.

FIG. 7C shows a second runtime distribution plot 320 that depicts the respective decoding runtime distributions $\mathbb{P}_{dec}$ of the first decoder 302 and the second decoder 304 for a distance-25 surface code that has a physical noise rate $p=10^{-3}$ and an SEC cycle time of $t_{SEC}=10^{-4}$ seconds. FIG. 7D shows a second range plot 330 of the ranges of the first decoder 302 and the second decoder 304 for the above values of d, p, and $t_{SEC}$. When $t_{SEC}=10^{-4}$, the maximum-range stopping time M for the first decoder 302 is reached at 17 SEC cycles, with range of 6,544,502,617,801. For the second decoder 304, the maximum-range stopping time M drops to 11 SEC cycles, with a range of 3,378,378,378,378. Thus, as shown in the examples of FIGS. 7A-7D, the gap between the maximum-range stopping times M is more significant with qubits that have shorter SEC cycle durations $t_{SEC}$.

Returning to the example of FIG. 1, a protocol for choosing between the candidate decoders 32 is discussed below. The identification of the maximum-range stopping time M is relevant for maximizing the depth of a logical circuit that can be implemented reliably with a given code distance d and a given decoder. However, the stopping time optimization on its own does not provide guidance on which candidate decoder 32 is more resource-efficient, since there is a tradeoff between decoder speed and accuracy. The protocol discussed below identifies the most resource-efficient decoder for a fault-tolerant quantum computing device 50 configured to perform a given number of logical operations. Using this protocol, the one or more processing devices 12 are configured to compute respective spacetime costs 40 of the candidate decoders 32 based at least in part on the quantum circuit parameters 20 and the decoder parameters 30.

The decoder resource cost computation protocol is used when designing a quantum computing device 50 configured to perform $n_T$ logical T gates reliably (which, in this example, refers to the outcome of the full logical circuit having an error probability below the logical error rate threshold E). The spacetime cost 40 of the candidate decoder 32 is computed given qubits with a physical noise rate p and an SEC cycle time $t_{SEC}$. The spacetime cost 40 of the candidate decoder 32 is defined as follows:

$$\text{cost}(p, n_T, d, M) = \begin{cases} +\infty & \text{if range}(\delta, p, M) < n_T \\ 2d^2 \Delta(p, n_T, d, M) & \text{otherwise} \end{cases}$$

Thus, as shown in FIG. 4, the computation of the spacetime cost 40 includes determining whether the range 60 is greater than the number of T gates $n_T$ included in the quantum circuit 24. The one or more processing devices 12 are further configured to determine the value of the spacetime cost 40 based at least in part on the determination 70 of whether the range 60 is greater than the number of T gates $n_T$. When the one or more processing devices 12 determine that the range 60 of a candidate decoder 32 is less than the number of T gates $n_T$, the one or more processing devices 12 are configured to reject that candidate decoder 32 by setting the spacetime cost 40 to infinity or some other large positive number. Otherwise, the one or more processing devices 12 are further configured to compute the spacetime cost 40 based at least in part on the SEC depth $\Delta$, as shown above.

In the above equation for the spacetime cost 40, the SEC depth $\Delta$ is used as a proxy for the temporal duration of executing the candidate decoder 32. In addition, the $2d^2$ factor is used as a proxy for the spatial area used to execute the candidate decoder 32. The spacetime cost 40 therefore incorporates both temporal and spatial information about decoder efficiency.

The minimum spacetime cost 41 of a candidate decoder 32 may be defined as the minimum value among the spacetime costs 40 of all odd distances and all stopping times for that candidate decoder 41. The minimum spacetime cost 41 of the candidate decoder 32 is accordingly denoted as follows:

$$\text{mincost}(p, n_T) = \min\{\text{cost}(p, n_T, d, M) \mid \delta \text{ odd}, M > 0\}$$

In examples in which the physical noise rate p is above a threshold at which a range greater than or equal to the number of T gates $n_T$ is achievable, the minimum spacetime cost 41 may be infinite. The pair ($\delta$, M) that achieves the minimum spacetime cost 41 is denoted $\delta$, M=argmincost(p, $n_T$).

To select the highest-efficiency decoder for a fault-tolerant quantum computing device 50 configured to implement $n_T$ logical T gates, the one or more processing devices 12 are configured to select a lowest-spacetime-cost decoder 42 among the plurality of candidate decoders 32. When selecting the lowest-spacetime-cost decoder 42, the one or more processing devices 12 are configured to compare the minimum spacetime costs 41 of the candidate decoders 32. The corresponding smallest odd-integer code distance δ and maximum-range stopping time M for that lowest-spacetime-cost decoder 42 are also selected. The one or more processing devices 12 are further configured to output the selection of the lowest-spacetime-cost decoder 42 of the plurality of candidate decoders 32 for implementation at the quantum computing device 50. In addition, the one or more processing devices 12 may be further configured to output the smallest odd-integer code distance δ and the maximum-range stopping time M.

Example spacetime cost computations are discussed below for the first decoder 302 and the second decoder 304 of FIGS. 7A-7D. In this example, the spacetime costs 40 of the first decoder 302 and the second decoder 304 are computed during development of a quantum computing device 50 configured to reliably execute $n_T=10^6$ logical T gates. The minimum spacetime cost 40 of the first decoder 302 is numerically approximated as 42,250,000,000, which is achieved with δ=13 and M=34. The minimum spacetime cost of the second decoder 304 is numerically approximated as 35,828,000,000, which is achieved with δ=13 and M=15. Thus, even though the first decoder 302 provides a logical error rate which is twice as small as that of the second decoder 304, the second decoder 304 has a higher spacetime cost 40.

In some other examples, a different function is used when computing the spacetime costs 40 of candidate decoders 32. For example, the relative importance of space and time may be adjusted by introducing weights associated with the qubit count and/or the circuit depth in the cost function. These weights may be applied by raising the spatial or temporal factor in the expression $2d^2 \Delta(p, n_T, d, M)$ to an exponent other than one. The factor of 2 in the expression $2d^2 \Delta(p, n_T, d, M)$ may also be replaced with a different scalar constant when the Floquet code is used as the error correction code 22 instead of the surface code.

Figure 8A:
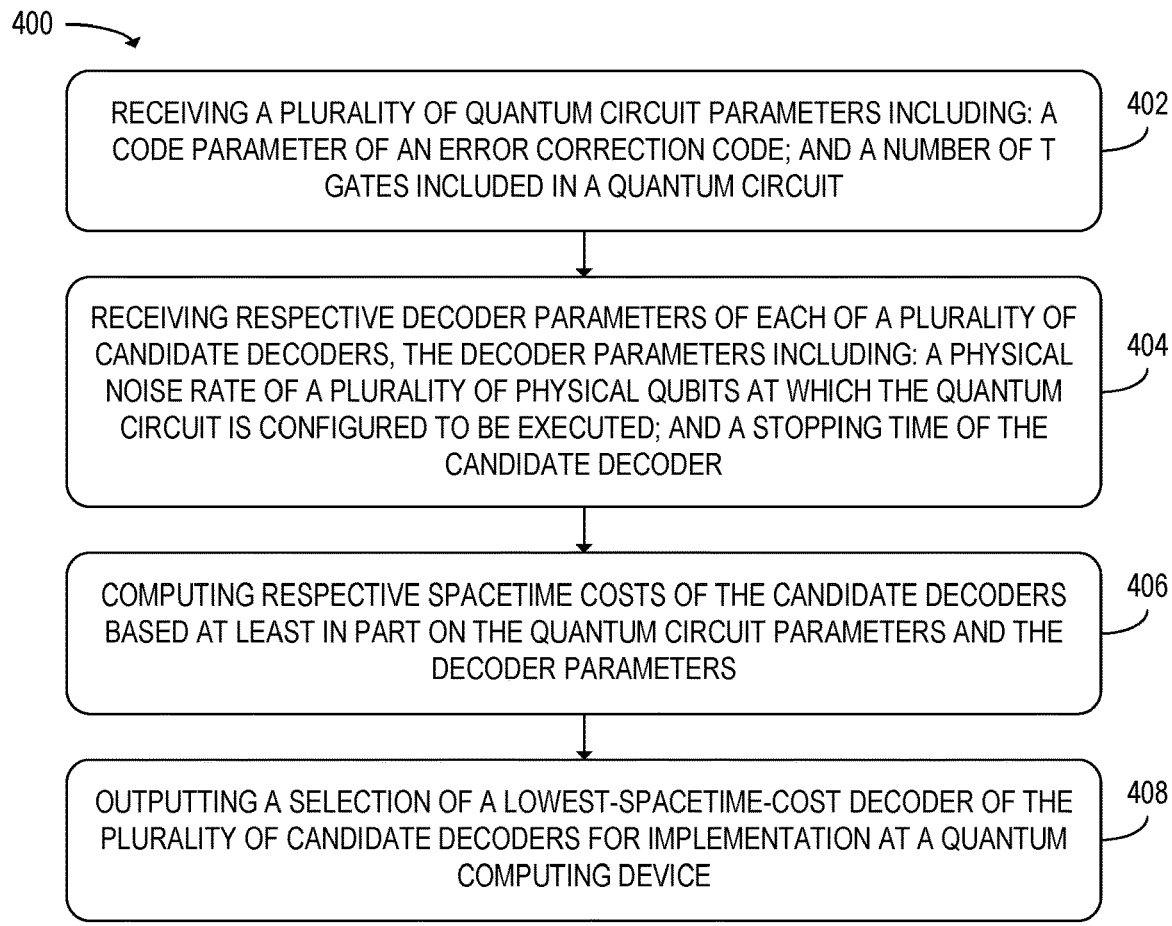
FIG. 8A shows a flowchart of a method for use with a computing system to select a decoder to implement at a quantum computing device, according to the example of FIG. 1.

FIG. 8A shows a flowchart of a method 400 for use with a computing system to select a decoder to implement at a quantum computing device. The method 400 may be performed at a classical computing device during quantum computing device development.

At step 402, the method 400 includes receiving a plurality of quantum circuit parameters. The plurality of quantum circuit parameters are associated with a quantum circuit that includes a plurality of logical operations. For example, the quantum circuit may be a sequence of logical gates that are each an HT gate or an HST gate. The quantum circuit parameters include a code parameter of an error correction code with which the logical operations are encoded. For example, the error correction code may be a surface code or a Floquet code. The code parameter of the error correction code may be a code distance or a code length of the error correction code. In addition, the quantum circuit parameters include a number of T gates included in the quantum circuit.

At step 404, the method 400 further includes receiving respective decoder parameters of each of a plurality of candidate decoders. The decoder parameters include a physical noise rate of a plurality of physical qubits at which the quantum circuit is configured to be executed. In addition, the decoder parameters include a stopping time of the candidate decoder. The stopping times of the candidate decoders may be iteratively computed, as discussed below.

At step 406, the method 400 further includes computing respective spacetime costs of the candidate decoders based at least in part on the quantum circuit parameters and the decoder parameters. The spacetime costs of the candidate decoders encode estimates of both spatial and temporal efficiency of the decoders. At step 408, the method 400 further includes outputting a selection of a lowest-spacetime-cost decoder of the plurality of candidate decoders for implementation at a quantum computing device. Thus, an efficient decoder is selected.

Figure 8B:
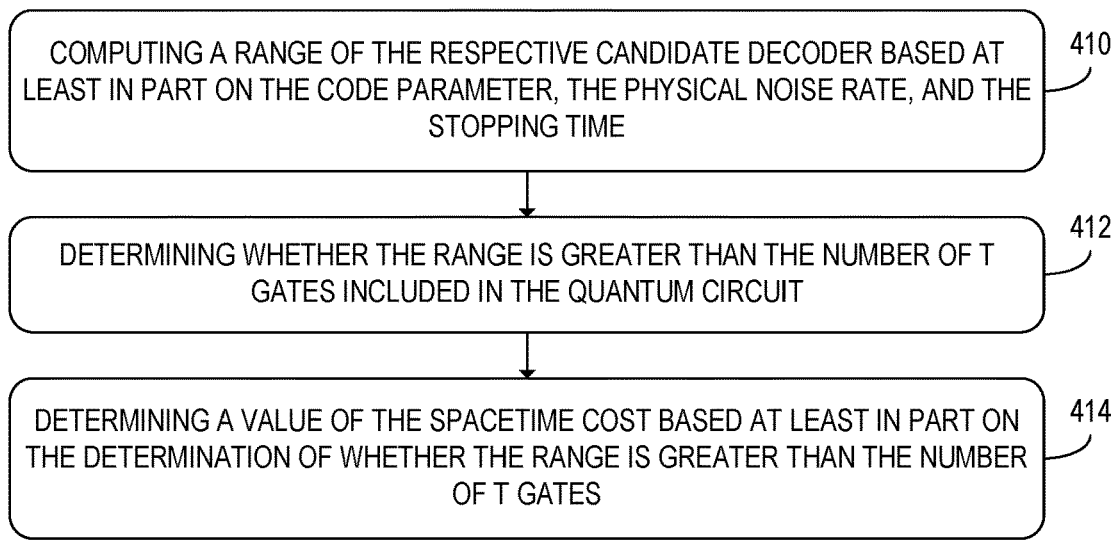
FIG. 8B shows additional steps of the method of FIG. 8A that may be performed when computing spacetime costs from quantum circuit parameters and decoder parameters.

FIGS. 8B-8E show additional steps of the method 400 that are performed in some examples. FIG. 8B shows additional steps that may be performed when computing each of the spacetime costs from the quantum circuit parameters and the respective decoder parameters of a candidate decoder. At step 410, the method 400 further includes computing a range of the respective candidate decoder based at least in part on the code parameter, the physical noise rate, and the stopping time. The range of the candidate decoder is an estimate of a number of logical gates that are reliably executable using the candidate decoder to within a performance standard, as discussed below.

At step 412, the method 400 further includes determining whether the range is greater than the number of T gates included in the quantum circuit. At step 414, the method 400 further includes determining a value of the spacetime cost based at least in part on the determination of whether the range is greater than the number of T gates. For example, when the range is lower than the number of T gates, the spacetime cost may be set to infinity or another large positive number, whereas the spacetime cost may be computed in a different manner when the range is greater than the number of T gates. Thus, a candidate decoder may be rejected when the candidate decoder has too short a range for the quantum computing device to reliably implement the quantum circuit.

Figure 8C:
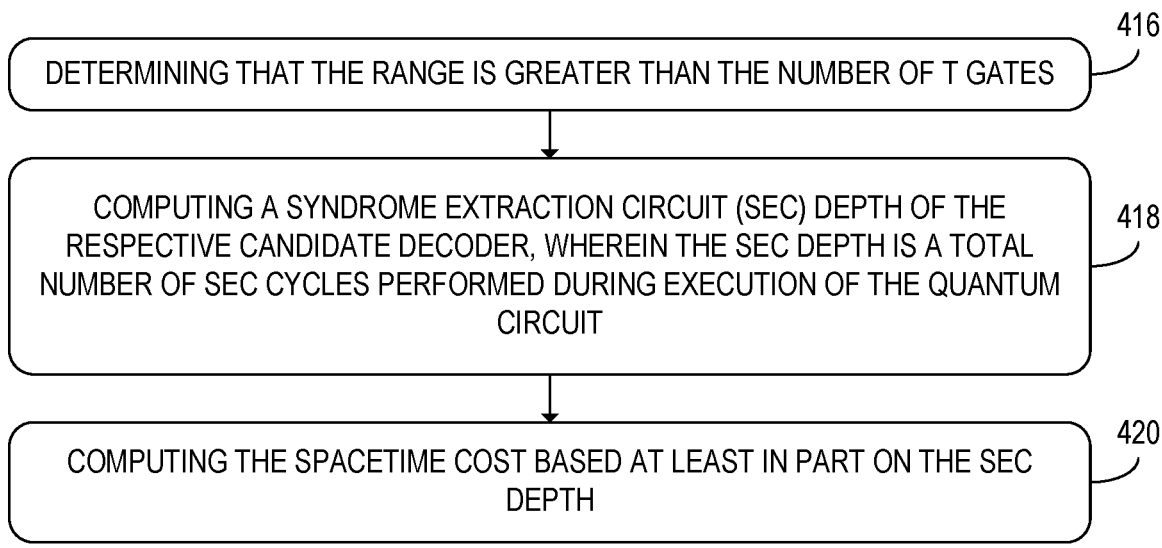
FIG. 8C shows additional steps of the method of FIG. 8B when computing a spacetime cost.

FIG. 8C shows additional steps of the method 400 that may be performed when the value of the spacetime cost is determined at step 414. At step 416, the method 400 further includes determining that the range is greater than the number of T gates. At step 418, the method 400 further includes computing a syndrome extraction circuit (SEC) depth of the respective candidate decoder. The SEC depth is a total number of SEC cycles performed during execution of the quantum circuit. At step 420, the method 400 further includes computing the spacetime cost based at least in part on the SEC depth. The SEC depth may be used as a proxy for the amount of time used to execute the quantum circuit with a specific candidate decoder.

Figure 8D:
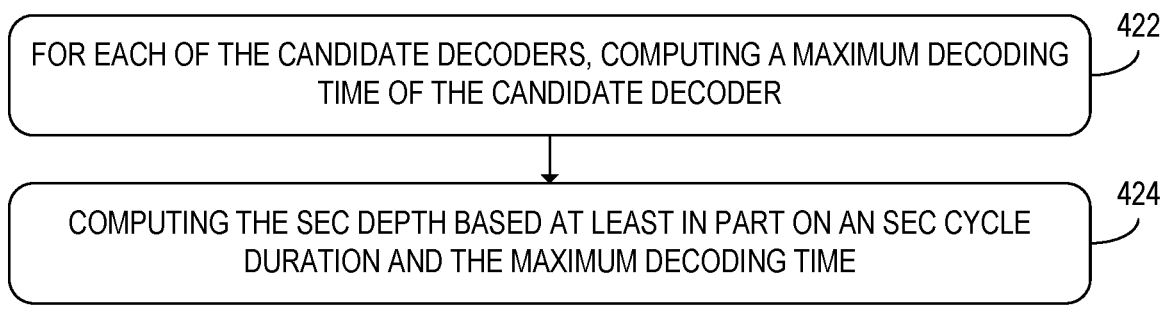
FIG. 8D shows additional steps that may be performed when computing a syndrome extraction circuit depth, according to the example of FIG. 8D.

FIG. 8D shows steps that may be performed when computing the SEC depth in examples in which the steps of FIG. 8C are performed. In the example of FIG. 8D, the quantum circuit parameters further include an SEC cycle duration of the SEC that indicates an amount of time elapsed when performing syndrome extraction using the SEC. At step 422, the method 400 further includes, for each of the candidate decoders, computing a maximum decoding time of the candidate decoder. At step 424, the method 400 further includes computing the SEC depth based at least in part on the SEC cycle duration and the maximum decoding time. The computation of the SEC depth may also take the number of T gates, the code depth, and the physical noise rate as inputs.

Figure 8E:
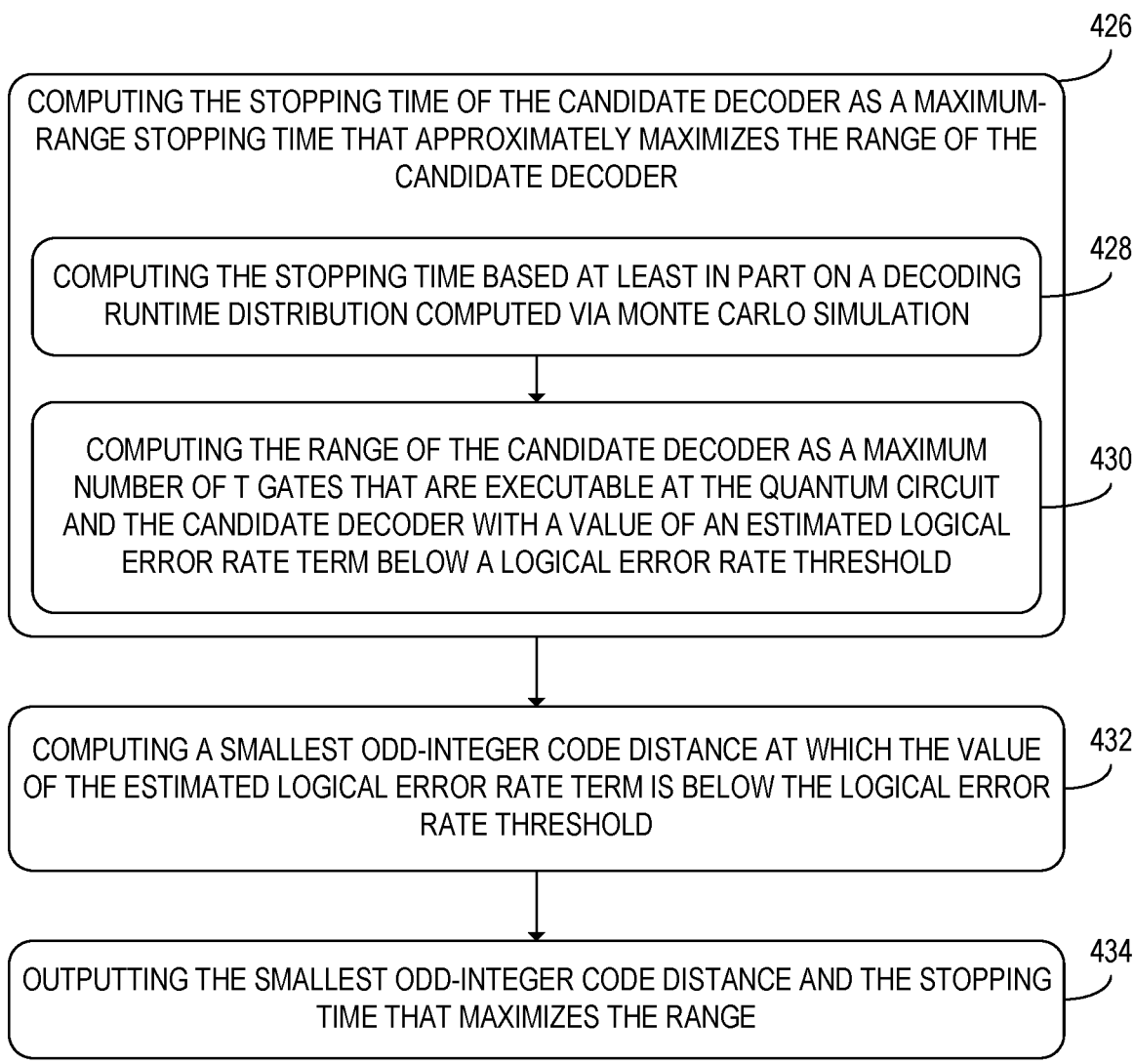
FIG. 8E shows additional steps of the method of FIG. 8A that may be performed in some examples.

FIG. 8E shows additional steps of the method 400 that may be performed in some examples. At step 426, the method 400 further includes computing the stopping time of the candidate decoder as a maximum-range stopping time that approximately maximizes the range of the candidate decoder. In some examples, the stopping time and the range are iteratively recomputed in a range maximization loop. Step 426 includes, at step 428, computing the stopping time based at least in part on a decoding runtime distribution. The decoding runtime distribution is computed via Monte Carlo simulation and indicates estimated probabilities that execution of the decoder is completed at respective times.

In the example of FIG. 8E, the quantum circuit parameters further include a logical error rate threshold. At step 430, step 426 further includes computing the range of the candidate decoder as a maximum number of T gates that are executable at the quantum circuit and the candidate decoder with a value of an estimated logical error rate term below the logical error rate threshold. Accordingly, the estimated logical error rate term is approximately proportional to a logical error rate of executing the quantum circuit using the candidate decoder.

In the example of FIG. 8E, the code parameter is the code distance of the error correction code. At step 432, the method 400 further includes computing a smallest odd-integer code distance at which the value of the estimated logical error rate term is below the logical error rate threshold. The candidate code distance values may be iteratively recomputed to search for the smallest odd-integer code distance. At step 434, the method 400 further includes outputting the smallest odd-integer code distance and the stopping time that maximizes the range. The smallest odd-integer code distance and the maximum-range stopping time may be output as parameters of the lowest-spacetime-cost decoder.

Using the systems and methods discussed above, a decoder is selected for implementation at a quantum computing device. The decoder is selected in a manner in which spatial and temporal efficiency are both taken into account rather than solely basing the selection on accuracy. Accordingly, selecting the decoder using the techniques discussed above allows a quantum computing device under development to be scaled to larger numbers of qubits more efficiently.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
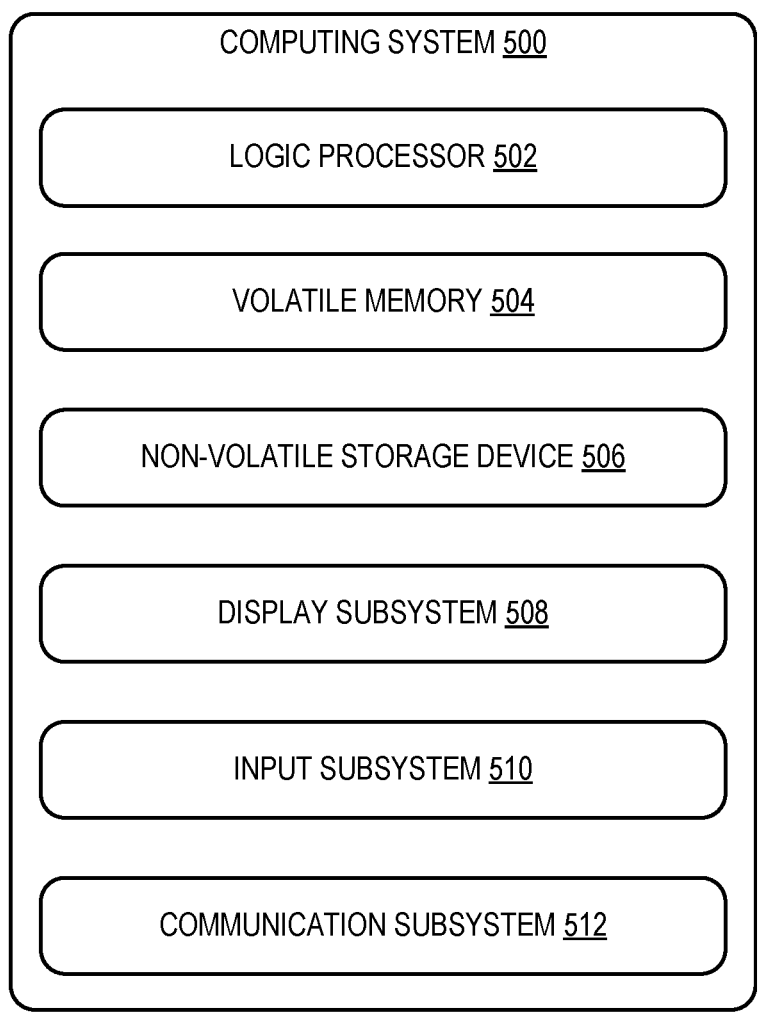
FIG. 9 shows a schematic view of an example computing environment in which the computing system of FIG. 1 may be instantiated.

FIG. 9 schematically shows a non-limiting embodiment of a computing system 500 that can enact one or more of the methods and processes described above. Computing system 500 is shown in simplified form. Computing system 500 may embody the computing system 10 described above and illustrated in FIG. 1. Components of computing system 500 may be included in one or more personal computers, server computers, tablet computers, home-entertainment computers, network computing devices, video game devices, mobile computing devices, mobile communication devices (e.g., smartphone), and/or other computing devices, and wearable computing devices such as head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 9.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built in. Non-volatile storage device 506 may include optical memory, semiconductor memory, and/or magnetic memory, or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, camera, or microphone.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 500 to send and/or receive messages to and/or from other devices via a network such as the Internet.

The following paragraphs discuss several aspects of the present disclosure. According to one aspect of the present disclosure, a computing system is provided, including one or more processing devices configured to receive a plurality of quantum circuit parameters including a code parameter of an error correction code. The quantum circuit parameters further include a number of T gates included in a quantum circuit. The one or more processing devices are further configured to receive respective decoder parameters of each of a plurality of candidate decoders. The decoder parameters include a physical noise rate of a plurality of physical qubits at which the quantum circuit is configured to be executed. The decoder parameters further include a stopping time of the candidate decoder. The one or more processing devices are further configured to compute respective spacetime costs of the candidate decoders based at least in part on the quantum circuit parameters and the decoder parameters. The one or more processing devices are further configured to output a selection of a lowest-spacetime-cost decoder of the plurality of candidate decoders for implementation at a quantum computing device. The above features may have the technical effect of selecting a decoder for a quantum computing device in a manner that accounts for both spatial and temporal efficiency.

According to this aspect, the one or more processing devices may be configured to compute each of the spacetime costs at least in part by computing a range of the respective candidate decoder based at least in part on the code distance, the physical noise rate, and the stopping time. Computing each of the spacetime costs may further include determining whether the range is greater than the number of T gates included in the quantum circuit. Computing each of the spacetime costs may further include determining a value of the spacetime cost based at least in part on the determination of whether the range is greater than the number of T gates. The above features may have the technical effect of checking whether the candidate decoder has a sufficiently long range for the quantum computing device to reliably implement the quantum circuit.

According to this aspect, the one or more processing devices may determine that the range is greater than the number of T gates. The one or more processing devices may be further configured to compute the spacetime cost of the candidate decoder at least in part by computing a syndrome extraction circuit (SEC) depth of the respective candidate decoder. The SEC depth is a total number of SEC cycles performed during execution of the quantum circuit. The one or more processing devices may be further configured to compute the spacetime cost based at least in part on the SEC depth. The above features may have the technical effect of incorporating an estimate of temporal duration into the computation of the spacetime cost.

According to this aspect, the quantum circuit parameters may further include an SEC cycle duration of the SEC. For each of the candidate decoders, the one or more processing devices may be further configured to compute a maximum decoding time of the candidate decoder. The one or more processing devices are further configured to compute the SEC depth based at least in part on the SEC cycle duration and the maximum decoding time. The above features may have the technical effect of computing the maximum number of SEC cycles performed during execution of the quantum circuit.

According to this aspect, the one or more processing devices may be further configured to compute the stopping time of the candidate decoder as a maximum-range stopping time that approximately maximizes the range of the candidate decoder. The above features may have the technical effect of increasing the depth of sequences of logical gates that can be implemented with a logical error rate below a threshold.

According to this aspect, the one or more processing devices may be configured to compute the stopping time based at least in part on a decoding runtime distribution computed via Monte Carlo simulation. The above features may have the technical effect of computing an estimate of the maximum-range stopping time.

According to this aspect, the quantum circuit parameters may further include a logical error rate threshold. The one or more processing devices may be further configured to compute the range of the candidate decoder as a maximum number of T gates that are executable at the quantum circuit and the candidate decoder with a value of an estimated logical error rate term below the logical error rate threshold. The above features may have the technical effect of computing the range for the candidate decoder at a given value of an acceptable logical error rate.

According to this aspect, the code parameter of the error correction code may be a code distance or a code length. The above features may have the technical effect of incorporating spatial information related to the candidate decoder into the computation of the spacetime cost.

According to this aspect, the code parameter may be the code distance of the error correction code. The one or more processing devices may be further configured to compute a smallest odd-integer code distance at which the value of the estimated logical error rate term is below the logical error rate threshold. The one or more processing devices may be further configured to output the smallest odd-integer code distance and the stopping time that maximizes the range. The above features may have the technical effect of computing and outputting the lowest code distance that allows for reliable implementation of the quantum circuit. The above features may have the additional technical effect of outputting the stopping time at which the range of the candidate decoder is maximized.

According to this aspect, the error correction code may be a surface code or a Floquet code. The above features may have the additional technical effect of performing quantum error correction in a manner that allows for efficient encoding and decoding.

According to this aspect, the quantum circuit is a sequence of logical gates that are each an HT gate or an HST gate. The above features may have the additional technical effect of performing a single-qubit logical operation at the quantum circuit.

According to another aspect of the present disclosure, a method is provided, including receiving a plurality of quantum circuit parameters that include a code parameter of an error correction code. The quantum circuit parameters further include a number of T gates included in a quantum circuit. The method further includes receiving respective decoder parameters of each of a plurality of candidate decoders. The decoder parameters include a physical noise rate of a plurality of physical qubits at which the quantum circuit is configured to be executed. The decoder parameters further include a stopping time of the candidate decoder. The method further includes computing respective spacetime costs of the candidate decoders based at least in part on the quantum circuit parameters and the decoder parameters. The method further includes outputting a selection of a lowest-spacetime-cost decoder of the plurality of candidate decoders for implementation at a quantum computing device. The above features may have the technical effect of selecting a decoder for a quantum computing device in a manner that accounts for both spatial and temporal efficiency.

According to this aspect, computing each of the spacetime costs may include computing a range of the respective candidate decoder based at least in part on the code parameter, the physical noise rate, and the stopping time. Computing each of the spacetime costs may further include determining whether the range is greater than the number of T gates included in the quantum circuit. Computing each of the spacetime costs may further include determining a value of the spacetime cost based at least in part on the determination of whether the range is greater than the number of T gates. The above features may have the technical effect of checking whether the candidate decoder has a sufficiently long range for the quantum computing device to reliably implement the quantum circuit.

According to this aspect, the method may further include determining that the range is greater than the number of T gates. The method may further include computing the spacetime cost of the candidate decoder at least in part by computing a syndrome extraction circuit (SEC) depth of the respective candidate decoder. The SEC depth is a total number of SEC cycles performed during execution of the quantum circuit. The method may further include computing the spacetime cost based at least in part on the SEC depth. The above features may have the technical effect of incorporating an estimate of temporal duration into the computation of the spacetime cost.

According to this aspect, the quantum circuit parameters may further include an SEC cycle duration of the SEC. The method may further include, for each of the candidate decoders, computing a maximum decoding time of the candidate decoder. The method may further include computing the SEC depth based at least in part on the SEC cycle duration and the maximum decoding time. The above features may have the technical effect of computing the maximum number of SEC cycles performed during execution of the quantum circuit.

According to this aspect, the method may further include computing the stopping time of the candidate decoder as a maximum-range stopping time that approximately maximizes the range of the candidate decoder. The above features may have the technical effect of increasing the depth of sequences of logical gates that can be implemented with a logical error rate below a threshold.

According to this aspect, the quantum circuit parameters may further include a logical error rate threshold. The method may further include computing the range of the candidate decoder as a maximum number of T gates that are executable at the quantum circuit and the candidate decoder with a value of an estimated logical error rate term below the logical error rate threshold. The above features may have the technical effect of computing the range for the candidate decoder at a given value of an acceptable logical error rate.

According to this aspect, the code parameter may be a code distance of the error correction code. The method may further include computing a smallest odd-integer code distance at which the value of the estimated logical error rate term is below the logical error rate threshold. The method may further include outputting the smallest odd-integer code distance and the stopping time that maximizes the range. The above features may have the technical effect of computing and outputting the lowest code distance that allows for reliable implementation of the quantum circuit. The above features may have the additional technical effect of outputting the stopping time at which the range of the candidate decoder is maximized.

According to this aspect, the error correction code may be a surface code or a Floquet code. The above features may have the additional technical effect of performing quantum error correction in a manner that allows for efficient encoding and decoding.

According to another aspect of the present disclosure, a computing system is provided, including one or more processing devices configured to receive a plurality of quantum circuit parameters. The plurality of quantum circuit parameters include a code distance of an error correction code and a number of T gates included in a quantum circuit. The one or more processing devices are further configured to receive respective decoder parameters of each of a plurality of candidate decoders. The decoder parameters include a physical noise rate of a plurality of physical qubits at which the quantum circuit is configured to be executed. The one or more processing devices are further configured to compute respective maximum-range stopping times that approximately maximizes a respective range of each of the candidate decoders. The respective range of each of the decoders is computed based at least in part on the code distance, the physical noise rate, and a stopping time. The one or more processing devices are further configured to compute respective spacetime costs of the candidate decoders based at least in part on the quantum circuit parameters and the decoder parameters. The one or more processing devices are further configured to output a selection of a lowest-spacetime-cost decoder of the plurality of candidate decoders for implementation at a quantum computing device. The above features may have the technical effect of selecting a decoder for a quantum computing device in a manner that accounts for both spatial and temporal efficiency.

"And/or" as used herein is defined as the inclusive or ∨, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
one or more processing devices configured to:
receive a plurality of quantum circuit parameters including:
a code parameter of an error correction code; and
a number of T gates included in a quantum circuit;
receive respective decoder parameters of each of a plurality of candidate decoders, the decoder parameters including:
a physical noise rate of a plurality of physical qubits at which the quantum circuit is configured to be executed; and
a stopping time of the candidate decoder;
compute respective spacetime costs of the candidate decoders based at least in part on the quantum circuit parameters and the decoder parameters;
output a selection of a lowest-spacetime-cost decoder of the plurality of candidate decoders for implementation at a quantum computing device; and
implement the quantum computing device in hardware based at least in part on the selected lowest-spacetime-cost decoder.

2. The computing system of claim 1, wherein the one or more processing devices are configured to compute each of the spacetime costs at least in part by:
computing a range of the respective candidate decoder based at least in part on the code distance, the physical noise rate, and the stopping time;
determining whether the range is greater than the number of T gates included in the quantum circuit; and
determining a value of the spacetime cost based at least in part on the determination of whether the range is greater than the number of T gates.

3. The computing system of claim 2, wherein:
the one or more processing devices determine that the range is greater than the number of T gates; and
the one or more processing devices are further configured to compute the spacetime cost of the candidate decoder at least in part by:
computing a syndrome extraction circuit (SEC) depth of the respective candidate decoder, wherein the SEC depth is a total number of SEC cycles performed during execution of the quantum circuit; and
computing the spacetime cost based at least in part on the SEC depth.

4. The computing system of claim 3, wherein:
the quantum circuit parameters further include an SEC cycle duration of the SEC;
for each of the candidate decoders, the one or more processing devices are further configured to compute a maximum decoding time of the candidate decoder; and
the one or more processing devices are further configured to compute the SEC depth based at least in part on the SEC cycle duration and the maximum decoding time.

5. The computing system of claim 2, wherein the one or more processing devices are further configured to compute the stopping time of the candidate decoder as a maximum-range stopping time that approximately maximizes the range of the candidate decoder.

6. The computing system of claim 5, wherein the one or more processing devices are configured to compute the stopping time based at least in part on a decoding runtime distribution computed via Monte Carlo simulation.

7. The computing system of claim 5, wherein:
the quantum circuit parameters further include a logical error rate threshold; and
the one or more processing devices are further configured to compute the range of the candidate decoder as a maximum number of T gates that are executable at the quantum circuit and the candidate decoder with a value of an estimated logical error rate term below the logical error rate threshold.

8. The computing system of claim 7, wherein the code parameter of the error correction code is a code distance or a code length.

9. The computing system of claim 8, wherein:
the code parameter is the code distance of the error correction code; and
the one or more processing devices are further configured to:
compute a smallest odd-integer code distance at which the value of the estimated logical error rate term is below the logical error rate threshold; and
output:
the smallest odd-integer code distance; and
the stopping time that maximizes the range.

10. The computing system of claim 1, wherein the error correction code is a surface code or a Floquet code.

11. The computing system of claim 1, wherein the quantum circuit is a sequence of logical gates that are each an HT gate or an HST gate.

12. A method comprising:
receiving a plurality of quantum circuit parameters including:
a code parameter of an error correction code; and
a number of T gates included in a quantum circuit;
receiving respective decoder parameters of each of a plurality of candidate decoders, the decoder parameters including:
a physical noise rate of a plurality of physical qubits at which the quantum circuit is configured to be executed; and
a stopping time of the candidate decoder;
computing respective spacetime costs of the candidate decoders based at least in part on the quantum circuit parameters and the decoder parameters;

outputting a selection of a lowest-spacetime-cost decoder of the plurality of candidate decoders for implementation at a quantum computing device; and implementing the quantum computing device in hardware based at least in part on the selected lowest-spacetime-cost decoder.

13. The method of claim 12, wherein computing each of the spacetime costs includes:

computing a range of the respective candidate decoder based at least in part on the code parameter, the physical noise rate, and the stopping time;

determining whether the range is greater than the number of T gates included in the quantum circuit; and determining a value of the spacetime cost based at least in part on the determination of whether the range is greater than the number of T gates.

14. The method of claim 13, further comprising:

determining that the range is greater than the number of T gates; and computing the spacetime cost of the candidate decoder at least in part by:

computing a syndrome extraction circuit (SEC) depth of the respective candidate decoder, wherein the SEC depth is a total number of SEC cycles performed during execution of the quantum circuit; and computing the spacetime cost based at least in part on the SEC depth.

15. The method of claim 14, wherein:

the quantum circuit parameters further include an SEC cycle duration of the SEC; and the method further comprises:

for each of the candidate decoders, computing a maximum decoding time of the candidate decoder; and computing the SEC depth based at least in part on the SEC cycle duration and the maximum decoding time.

16. The method of claim 13, further comprising computing the stopping time of the candidate decoder as a maximum-range stopping time that approximately maximizes the range of the candidate decoder.

17. The method of claim 16, wherein:

the quantum circuit parameters further include a logical error rate threshold; and the method further comprises computing the range of the candidate decoder as a maximum number of T gates that are executable at the quantum circuit and the candidate decoder with a value of an estimated logical error rate term below the logical error rate threshold.

18. The method of claim 17, wherein:

the code parameter is a code distance of the error correction code; and the method further comprises:

computing a smallest odd-integer code distance at which the value of the estimated logical error rate term is below the logical error rate threshold; and outputting:

the smallest odd-integer code distance; and the stopping time that maximizes the range.

19. The method of claim 12, wherein the error correction code is a surface code or a Floquet code.

20. A computing system comprising:

one or more processing devices configured to:

receive a plurality of quantum circuit parameters including:

a code distance of an error correction code; and a number of T gates included in a quantum circuit;

receive respective decoder parameters of each of a plurality of candidate decoders, the decoder parameters including a physical noise rate of a plurality of physical qubits at which the quantum circuit is configured to be executed;

compute respective maximum-range stopping times that approximately maximize a respective range of each of the candidate decoders, wherein the respective range of each of the decoders is computed based at least in part on the code distance, the physical noise rate, and a stopping time;

compute respective spacetime costs of the candidate decoders based at least in part on the quantum circuit parameters and the decoder parameters;

output a selection of a lowest-spacetime-cost decoder of the plurality of candidate decoders for implementation at a quantum computing device; and implement the quantum computing device in hardware based at least in part on the selected lowest-spacetime-cost decoder.

* * * * *